May 9, 1944.   W. J. RADY   2,348,571
GENERATOR VOLTAGE REGULATOR
Filed Nov. 26, 1941   2 Sheets-Sheet 1

INVENTOR
WILLIAM J. RADY
BY
Spencer, Hardman & Fehr
His ATTORNEYS

May 9, 1944. W. J. RADY 2,348,571
GENERATOR VOLTAGE REGULATOR
Filed Nov. 26, 1941 2 Sheets-Sheet 2

INVENTOR
WILLIAM J. RADY
By Spencer, Hardman & Fehr
HIS ATTORNEYS

Patented May 9, 1944

2,348,571

UNITED STATES PATENT OFFICE 2,348,571

GENERATOR VOLTAGE REGULATOR

William J. Rady, Anderson, Ind., assignor to General Motors Corporation, Detroit, Mich., a corporation of Delaware Application November 26, 1941, Serial No. 420,571

5 Claims. (Cl. 201—48)

This invention relates to a battery charging system and more particularly for automobile use wherein the engine drives a generator which charges a storage battery in which electrical energy is accumulated for the purpose of operating an engine starter or for supplying electric current to lamps when the engine is not running.

It is an object of the invention to provide improved means for controlling the amount of charging current in accordance with battery temperature. It is well known that the charging voltage of a storage battery is higher when cold than hot; therefore means have been provided for controlling the generator voltage regulator in such manner that the maximum voltage will be greater when the battery is cold and less when the battery is hot. This has been accomplished by placing a thermal switch inside the storage battery and bringing leads out through the walls of the battery to connect with a resistance unit by which the circuit of the electromagnet of the voltage regulator may be controlled. The use of a thermostat located within the storage battery complicates the construction of the battery and requires the disconnection of additional wires whenever the battery is removed for recharging at a service station.

It is an object of the present invention to provide for the protection of a storage battery against it being charged at an excessive rate when the battery is hot without the use of any devices which are mounted within or upon the storage battery. In order to accomplish this object I mount the thermostat which controls the generator voltage regulator in a container which can be mounted near the storage battery so as to be subjected to the same environment temperature, and I construct this container in such a manner that the thermostat will operate substantially according to its manner of operation if it were mounted within the battery.

The thermostat container is a metal body having relatively thick walls which are capable of absorbing and storing a substantial amount of heat some of which is received by the air within the metal body in order to operate the thermostat. The metal container is enclosed in a jacket of material having relatively low heat conductivity in order to retard the increase of the temperature of the metal body with respect to increasing the temperature of the surrounding atmosphere. The amount of retardation of heat transfer to the metal body is substantially the same as the amount of retardation of heat transfer which would be afforded by the walls of the storage battery. The ability of the metal container to absorb heat is commensurate with the heat absorbing ability of the elements within the storage battery, namely the plates and the electrolyte. I do not mean to say that the thermostat enclosing metal container of my invention has a heat absorbing ability equal in value to the heat absorbing ability of the elements within a storage battery case, but I wish to have it understood that the effect of the metal container upon the thermostat is the same as would be the case if the thermostat were placed within a battery cell. Also I wish to have it understood that whereas the total heat insulating value of the jacket for the metal container is not necessarily equal to the total heat insulating value of a storage battery case, the effect upon the thermostat by the heat insulating jacket of my invention is the same as the heat insulating effect of the storage battery case upon the thermostat placed therein.

Further objects and advantages of the present invention will be apparent from the following description, reference being had to the accompanying drawings wherein a preferred embodiment of the present invention is clearly shown.

Figure 1:
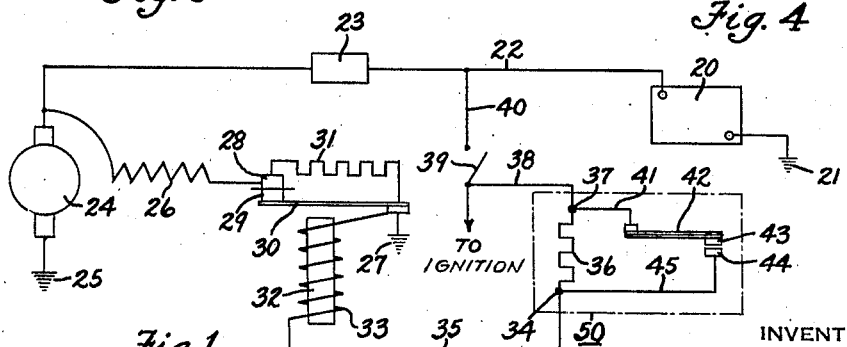
Fig. 1 is a wiring diagram showing the location of the thermal switch of my invention.
Figure 5:
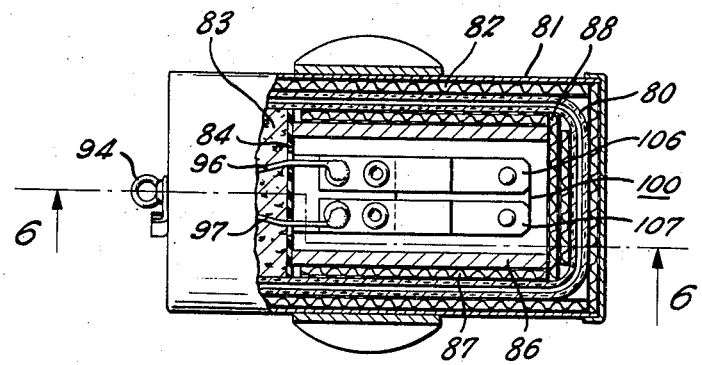
Fig. 5 is a side view partly in longitudinal section of another form of thermal switch.
Figure 6:
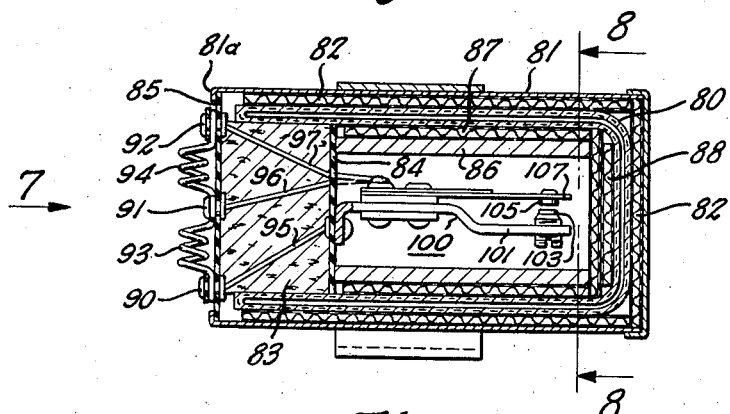
Fig. 6 is a sectional view on line 6—6 of Fig. 5.

Referring to Fig. 1, a storage battery 20 grounded at 21 is connected by wire 22 and a relay 23 with a generator 24 grounded at 25. Generator field 26 is connected to ground 27 through a contact 28, a movable contact 29 and armature 30 of a generator regulator. When the contact 29 is separated from the contact 28, the field 26 is connected to ground through a resistance 31. The armature 30 is attracted by an electromagnet comprising a core 32 and a winding 33. One end of the winding 33 is connected to ground 27, the other end of the winding is connected to the terminal 34 by wire 35. A resistance 36 connected to terminal 34 with the terminal 37 connected by wire 38 with an ignition switch 39 connected by wire 40 with wire 22. The terminal 37 is connected by a wire 41 to a bimetallic strip 42 carrying a movable contact 43 engageable with a stationary contact 44 which is connected by wire 45 to the terminal 34.

The contacts 43 and 44 are normally separated when the battery is cold. The operation of the circuit is as follows: When the generator 24 is operating above a certain speed at which its voltage is sufficient to cause the relay 23 to close, its charging voltage is limited by the voltage regulator. If, for example, the battery 20 is rated as a 6-volt battery, the regulator may be set to limit the charging voltage at 8-volts when the battery is cold. When the battery temperature attains a certain value, the thermal switch contacts 43 and 44 will close, thus short circuiting the resistance 36 and reducing the voltage at which the regulator will begin to regulate. The voltage may be reduced to seven or six and a half volts if desired, depending upon the value of the resistance 36. The thermal switch and the resistance 36 are constructed as a unit designated by the dot-dash line rectangle 50.

If desired the thermal switch may be a multi-stage device which shorts-out the resistance 36 in sections, for example, a two-stage device which shorts-out part of the resistance 36 at a thermostat temperature of around 100° F. and the remainder of the resistance at 125° F. Such a thermal switch would afford battery protection under hot weather conditions which are not unusual as well as under conditions of excessive heat as encountered in the tropical and subtropical deserts.

Figure 2:
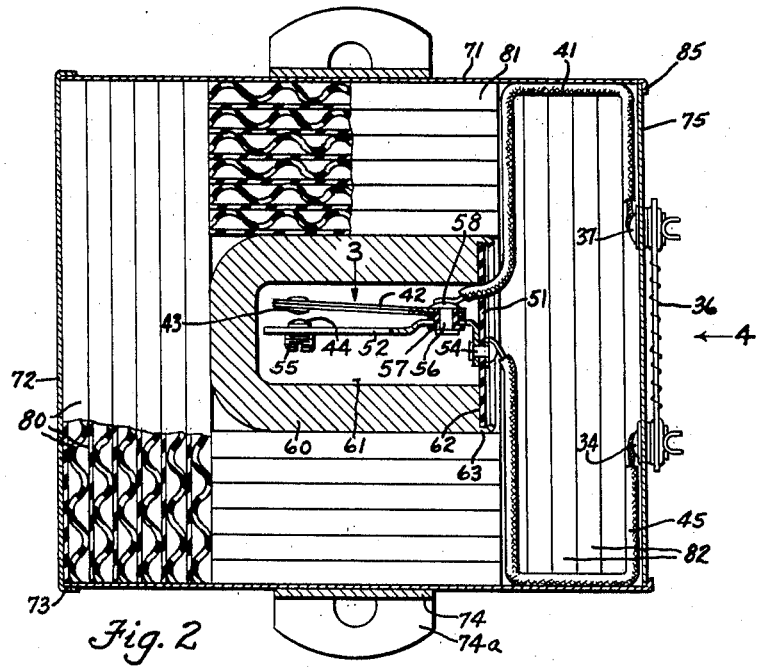
Fig. 2 is a sectional view of one form of thermal switch embodying the present invention.
Figure 3:
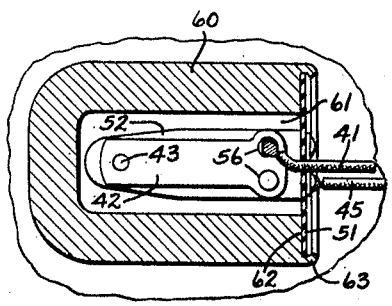
Fig. 3 is a fragmentary view showing a plan view of the thermal switch and its metal container in section.
Figure 4:
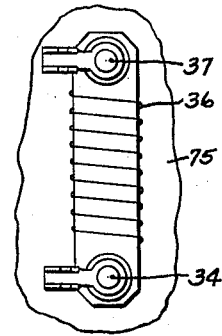
Fig. 4 is a fragmentary end view looking in the direction of arrow 4 of Fig. 2.

Referring now to Figs. 2 and 3, I have shown one specific construction of the unit 50 embodying my present invention. The unit 50 comprises a base or closure 51 of insulating material and upon which a bracket 52 is mounted. The bracket is anchored to the inside of the closure 51 by a rivet 54. On the outside of the closure end electrically connected to the rivet 54, and hence to the bracket 52, is the electric conductor or wire 45. A screw 55 having threaded engagement with a tapped hole in the bracket 52 carries the stationary contact 44. By turning the screw 55 of the stationary contact may be screwed in and out of the bracket for the purpose of adjusting the stationary contact relative to the movable contact 43.

The movable contact 43 carried by the bimetallic element 42, normally separated from the stationary contact, is adapted to make electric connection with the contact 44. The bimetallic element is secured at one end to the bracket 52 through a rivet 56 extending through an insulating bushing 57 and upset at 58 to hold the element 42 in assembled relation with the bracket 52. The head of the rivet 56 is an electrical connection with the element 42. The bimetallic element is also electrically connected with the wire or conductor 41 which passes through an opening in the closure 51.

The thermal switch assembly is mounted within a chamber 61 provided by a heat absorbing case 60 having relatively thick walls. For small volume, the material of the case 60 should have high specific heat and density. Porcelain and iron are very good. A zinc die-casting is also suitable and may be easily manufactured. The open end of the case 60 is formed to provide a shoulder 62 and a circular flange 63 within which the closure 51 is positioned with the base resting upon the shoulder 62. The flange 63 is spun over the outer surface of the closure, Fig. 3, to secure rigidly the latter against the shoulder 62. This unit is now ready to be assembled within a housing comprising a tube 71 closed at the bottom by a disc 72 joined to the tube by an annular flange 73 which may be soldered. The tube 71 is welded to a mounting bracket 74 having apertured ears 74a.

In the present instance it is desirable to support the resistance element 36 exterior of a cover 75 which closes the open end of the tube 71. In order that the thermal switch assembly may be inserted a substantial distance within the casing without breaking the electrical connections the wires 41 and 45 are provided with a certain amount of slack. The ends of the conductor wires 41 and 45 are respectively connected to the terminals 37 and 34 which project through the cover 75 and are insulated therefrom. The terminals 37 and 34 support a bar of non-conducting material, around which is wound the resistance wire 36, having one end electrically connected with the terminal 37 and the other end to the terminal 34.

To provide for the retardation of the transfer of heat into and out of the heat absorbing case 60 and the chamber 61 the case 60 is enclosed within a heat-transfer-retarding jacket comprising a group of discs 80, a wound-up strip 81 and a second group of discs 82. Before assembling the thermal switch within the casing, the discs 80 are placed upon the inner face of the metal disc 72. The strip 81 is wound about the case 60, and that assembly is placed with the housing 71. The discs 82 are placed adjacent the spiral strip 81 and the case 60. The discs 82 may be provided with spaced aligned notches at their peripheries to receive the wires 41 and 45, as shown in Fig. 2, or the discs 82 may be made smaller than the inside dimension of the tube 71 to allow the wires 41 and 45 to straddle the outer peripheries of the discs. After the insulating members, case 60 and the cover 75 are assembled with the case 71, these parts are secured together by spinning over the free end of the case 71 against the outer face of the cover at 85.

Instead of using a cellular structure constructed of corrugated cardboard to provide the jacket of low heat conductivity between the heat absorbing, switch-containing case and the surrounding atmosphere, a double-wall glass vacuum bottle can be used. Since a vacuum bottle is a much better insulator than card-board, it can be made much smaller than the corrugated cardboard jacket; hence the entire switch unit can be made smaller than shown in Fig. 2. A unit using a vacuum bottle is disclosed in Figs. 5 through 8. Vacuum bottle 80 is housed within a sheet metal case 81 and is protected by a single layer of corrugated paper 82. Bottle 80 receives a thick cork stopper 83 cemented to discs 84 and 85 of sheet insulating material. Disc 84 supports a two stage thermal switch 100 (to be described) surrounded by a heat absorbing tube 86 from which the vacuum bottle is protected by corrugated paper at 87 and 88. Disc 85 carries three terminals 90, 91, and 92 between which resistances 93 and 94 are connected. Terminals 90 and 92 are connected respectively with wires 35 and 38 of the diagram Fig. 1. Terminals 90, 91 and 92 are connected respectively with wires 95, 96 and 97 extending through the cork 83. The parts are permanently secured in assembled relation by spinning the case 81 at 81a against the disc 85.

Figures 7, 8:
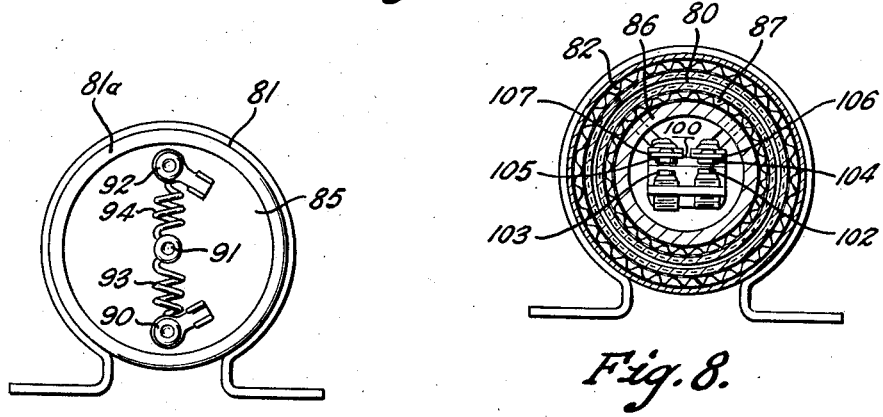
Fig. 7 is an end view.
Fig. 8 is a sectional view on line 8—8 of Fig. 6.

Thermal switch 100 comprises a metal bracket 101 attached to disc 84 and connected with wire 95. Bracket 101 carries contacts 102 and 103 on adjusting screws as shown in Fig. 8 and engageable, respectively, with contacts 104 and 105 on the free ends of blades 106 and 107, respectively, insulatingly supported by bracket 101 and connected, respectively, with wires 96 and 97. Blade 106 may close contacts 102, 104 at some intermediate temperature, such as 100° F., to short out resistance 93 in order to effect a part of the reduction of the voltage at which the regulator begins to regulate. Blade 107 may close contacts 103—105 at some higher temperature such as 125° F. to short out resistance 94, while resistance 93 remains shorted, in order to complete the total reduction of charging voltage.

While the embodiments of the present invention as herein disclosed, constitute preferred forms it is to be understood that other forms might be adopted, all coming within the scope of the claims which follow.

What is claimed is as follows:

1. A temperature-responsive unit for use with a storage battery and comprising a thermal switch, a heat absorbing body enclosing the switch, said body having an effect upon the thermal switch simulating the thermal effect of the elements of a storage battery upon a thermal switch located within the battery, and a heat-transfer-retarding jacket enclosing the body and having an effect upon the thermal switch simulating the thermal effect of the walls of a storage battery case upon a thermal switch located within the battery, a resistance unit supported outside the jacket and connections for connecting the resistance unit in the circuit of the thermal switch.

2. A unit according to claim 1, in which the material of the heat absorbing body is a metal having relatively high specific heat and density and in which the thermal switch is mounted upon a closure for an opening in the housing.

3. A unit according to claim 1, in which the heat-transfer-retarding jacket is a cellular structure made of corrugated paper.

4. A unit according to claim 1, in which the heat absorbing container is a hollow, cylindrical, metallic body, and in which the heat-transfer-retarding jacket comprises a wrapping of layers of corrugated paper wound around the cylindrical surface of the body and a plurality of corrugated paper discs facing each end of the metallic body and the enclosing wrapping of corrugated paper.

5. A unit according to claim 1 in which the heat-transfer-retarding jacket is provided by a double wall glass vacuum bottle, and in which there is a stopper for the bottle which supports the thermal switch.

WILLIAM J. RADY.